US012686490B2

(12) United States Patent
Birkey

(10) Patent No.: US 12,686,490 B2
(45) Date of Patent: Jul. 21, 2026

(54) COMPRESSION-FORCE SPIKE REDUCTION

(71) Applicant: Textron Aviation Inc., Wichita, KS (US)

(72) Inventor: Justin Birkey, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 596 days.

(21) Appl. No.: 18/170,247

(22) Filed: Feb. 16, 2023

(65) Prior Publication Data
US 2023/0257110 A1      Aug. 17, 2023

Related U.S. Application Data

(60) Provisional application No. 63/311,081, filed on Feb. 17, 2022.

(51) Int. Cl.
B64C 25/60 (2006.01)
F16F 9/06 (2006.01)
(52) U.S. Cl.
CPC .............. B64C 25/60 (2013.01); F16F 9/062 (2013.01)
(58) Field of Classification Search
CPC ................................. F16F 9/062; F16F 9/003
USPC ....................................................... 188/64.18
See application file for complete search history.

(56) References Cited

U.S. PATENT DOCUMENTS 4,088,286 A      5/1978 Masclet et al.
6,279,703 B1 *   8/2001 Mete ....................... B62K 25/28
                                                       267/64.18
6,938,887 B2 *   9/2005 Achenbach ............. F16F 9/084
                                                       267/64.18
10,018,240 B2    7/2018 Fazeli et al.
10,562,614 B2    2/2020 Cottet et al.
2003/0226607 A1 * 12/2003 Young ..................... F16L 55/04
                                                       138/30
2014/0046533 A1 * 2/2014 Nance ....................... B64F 5/60
                                                       701/33.7
2018/0194186 A1 * 7/2018 Anderson ............... F16F 9/585
2019/0257381 A1 * 8/2019 Patil ...................... F16F 3/0873
2019/0309817 A1 * 10/2019 Juracek ................. F16F 9/3485
2021/0024203 A1 * 1/2021 Chappell ................... F16F 9/49

FOREIGN PATENT DOCUMENTS

EP         0051506 A1 *  5/1982  ............. B64C 25/60
GB         2057629 A  *  4/1981  ............. B64C 25/60

* cited by examiner

*Primary Examiner* — Melody M Burch
(74) *Attorney, Agent, or Firm* — Avek IP, LLC

(57) ABSTRACT

A compression-force spike reduction system for a strut includes a first chamber and a second chamber, an orifice plate disposed within the strut between the first chamber and the second chamber, a hydraulic fluid disposed within the first chamber and the second chamber, and a compressible portion disposed in the second chamber. The orifice plate includes at least one orifice configured for the hydraulic fluid to flow through. During compression or extension of the strut, hydraulic fluid is exchanged between the first chamber and the second chamber. The compressible portion contains a compressible medium configured to buffer spikes in compression force of the strut. A compression-force spike reduction method includes filling the second chamber partially with the incompressible hydraulic fluid, and filling a remaining portion of the second chamber with a compressible medium.

13 Claims, 7 Drawing Sheets

LONGITUDINAL

TRANSVERSE

LONGITUDINAL

TRANSVERSE

COMPRESSION-FORCE SPIKE REDUCTION

CROSS-REFERENCE TO RELATED APPLICATIONS

This application claims the benefit of priority of U.S. Provisional Patent Application No. 63/311,081, entitled "Landing Gear Damping Force Spike Reduction" and filed on Feb. 17, 2022, the disclosure of which is herein incorporated by reference in its entirety.

BACKGROUND

1. Field

Embodiments of the invention relate generally to damping struts and shock absorbers, and more specifically to hydraulic struts used in landing gear and the like.

2. Related Art

Shock absorbers found in the prior art use a combination of gas and hydraulic fluid to dampen compression forces. For example, U.S. Pat. No. 10,018,240 to Fazeli et al. discloses a cylinder that contains hydraulic fluid and a gas. U.S. Pat. No. 10,562,614 to Cottet et al. discloses a strut assembly with a liquid and a gas in the pressure chamber. U.S. Pat. No. 4,088,286 to Masclet et al. discloses a shock-absorber having a peripheral chamber that contains compressed gas.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a compression-force spike reduction system for a strut includes: a first chamber and a second chamber; an orifice plate disposed within the strut between the first chamber and the second chamber; a hydraulic fluid disposed within the first chamber and the second chamber, wherein the orifice plate includes at least one orifice configured for the hydraulic fluid to flow therethrough, such that during compression or extension of the strut hydraulic fluid is exchanged between the first chamber and the second chamber; a compressible portion disposed in the second chamber, wherein the compressible portion contains a compressible medium configured to buffer spikes in compression force of the strut.

In another embodiment, a compression-force spike reduction system includes: a strut having a first chamber and a second chamber; an orifice plate disposed within the strut between the first chamber and the second chamber; an isolation piston slidably disposed within the first chamber, wherein the isolation piston separates a first compartment from a second compartment within the first chamber; a pressurized gas disposed within the second compartment, wherein the pressurized gas biases the isolation piston towards the first compartment; and a hydraulic fluid disposed within the first compartment and the second chamber, wherein the orifice plate includes at least one orifice configured for the hydraulic fluid to flow therethrough, such that during operation of the strut hydraulic fluid is exchanged between the first compartment and the second chamber.

In yet another embodiment, a compression-force spike reducing method includes: providing a strut having a first chamber, a second chamber, and an orifice plate disposed between the first chamber and the second chamber; filling the second chamber partially with the incompressible hydraulic fluid; and filling a remaining portion of the second chamber with a compressible medium, such that during compression of the strut the compressible medium is configured for reducing compression-force spikes.

BRIEF DESCRIPTION OF THE DRAWING FIGURES

Embodiments of the invention are described in detail below with reference to the attached drawing figures, wherein.

Figure 1:
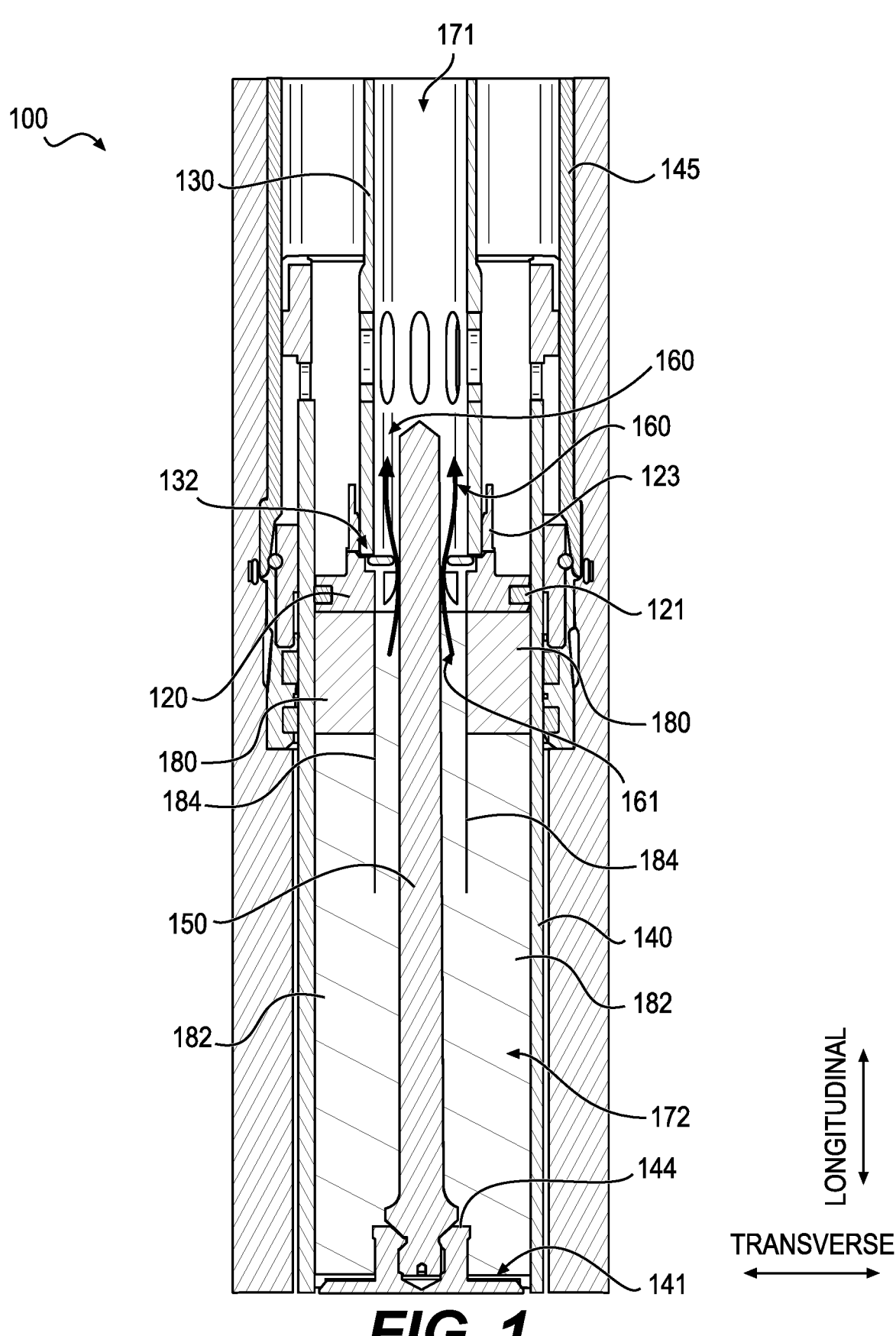
FIG. 1 is a cross-sectional view of a strut having a spike damping system of some embodiments during compression.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Landing gear structures on aircraft generally employ an oleo strut or shock absorber, in which a fluid is forced to flow between chambers. Resistance to the flow provides a damping force and control of the flow may be used to control the rate of oleo strut compression and extension. Prior to landing of the aircraft, the oleo strut is unweighted and in a fully extended position. As wheels of the landing gear touchdown, the oleo strut undergoes compression as the aircraft's weight and downward momentum are absorbed. After landing, the oleo strut undergoes partial extension since it supports the aircraft's weight but no longer resists any downward momentum. After liftoff, the wheels are unweighted, and the oleo strut returns to full extension.

Typical oleo struts have hydraulic fluid only in the compression chamber and both hydraulic fluid and gas in the extension chamber. The hydraulic fluid is a non-compressible fluid such as a mineral oil, for example. While these systems dampen initial shock of an aircraft landing, an improvement in dampening a spike in compression force is desirable. This is especially true in situations when the strut is already partially compressed and compression spikes are experienced, for example during aircraft taxiing. While taxiing, an aircraft strut is between about 30% to 80% compressed depending on the aircraft weight, center-of-gravity location, and the landing gear location of the strut (e.g., nose or aft). The present invention improves on prior struts by providing a spike reduction system that acts as a buffer to spikes in compression force, especially while the strut is already partially compressed.

Embodiments of the present disclosure provide an oleo strut that comprises a piston having a volume that includes two chambers, each having a compressible medium and an incompressible liquid. The two chambers are separated by an orifice through which the liquid flows to provide a damping force and to control the rate of oleo strut compression and extension. The compressible medium on the compression side of the orifice is configured to compress upon rapid compression thereby mitigating spikes in compression force exerted on the oleo strut. Due to a relatively small volume of compressible medium compared to hydraulic fluid in the compression chamber, only a minor effect on performance occurs during landing because the small volume of compressible medium is quickly compressed due to the large forces imparted upon landing. A large volume of compressible medium in the compression chamber is avoided because overall damping of the strut would be reduced. While taxiing, the strut is partially compressed due to the aircraft weight, and the small volume of compressible medium provides a cushion for mitigating compression spikes. The overall structure is therefore configured to provide both resilient shock absorption and oscillation dampening while under compression thereby providing an improved oleo strut.

Figure 2:
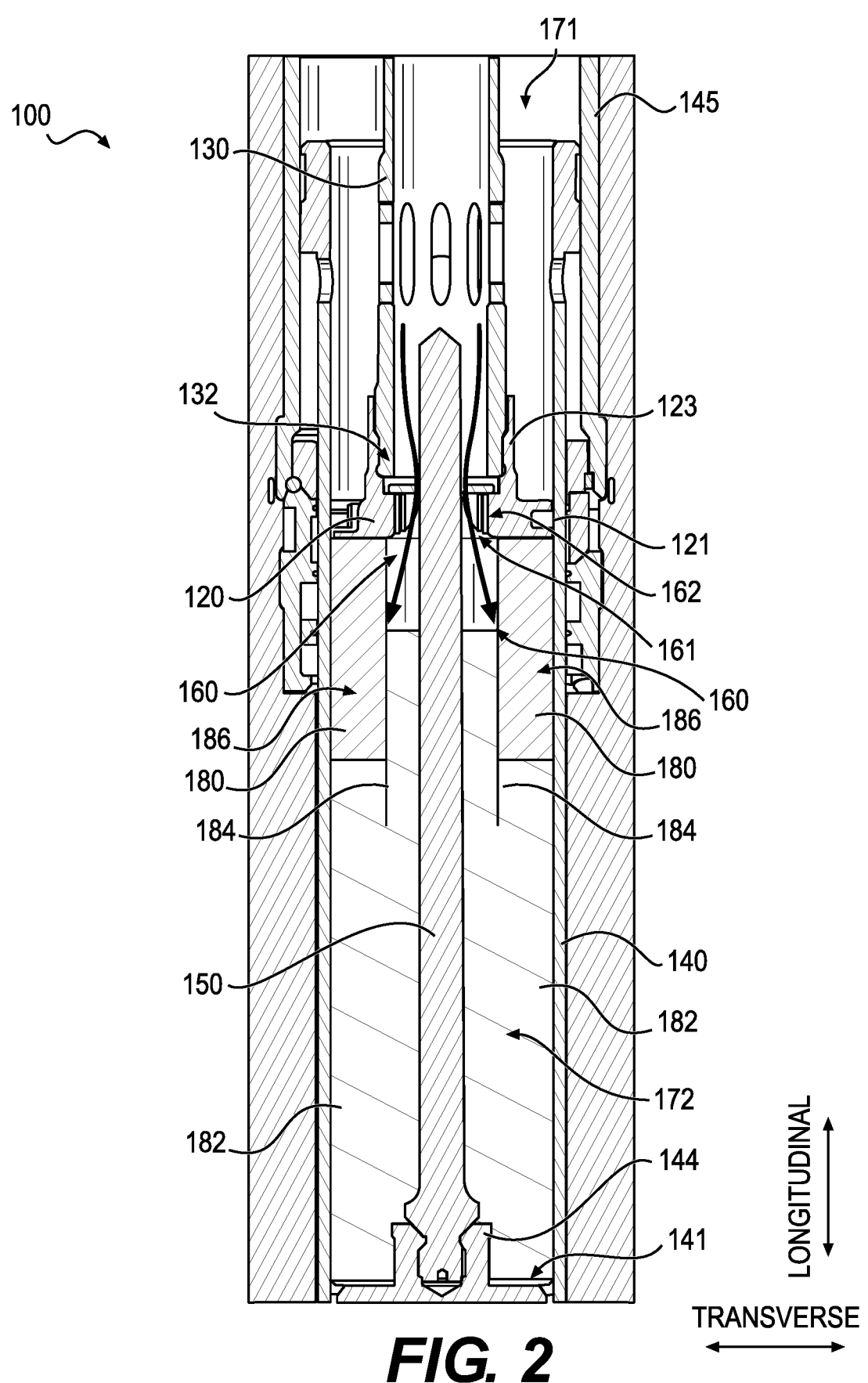
FIG. 2 is a cross-sectional view of the strut of FIG. 1 having a spike damping system of some embodiments during extension.

FIGS. 1-2 illustrate a cross-sectional side view along a mid-section of an exemplary strut 100 in some embodiments. FIG. 1 shows strut 100 during compression, while FIG. 2 shows strut 100 during extension. In some embodiments, strut 100 comprises some components similar to that of the oleo strut disclosed in U.S. Pat. No. 11,204,075 to Juracek et al., which is herein incorporated by reference in its entirety. Strut 100 is, for example, a pneumatic air-oil hydraulic shock absorber used on aircraft landing gear. Illustrated in these embodiments, strut 100 includes an inner cylinder 140 and an outer cylinder 145. Inner and outer cylinders 140, 145 are for example metal tubes or pistons (sometimes referred to as barrels) that are concentrically aligned with one another such that inner cylinder 140 is adapted for sliding within outer cylinder 145 in a longitudinal direction. Outer cylinder 145 provides a first chamber 171 and inner cylinder 140 provides a second chamber 172 for containing a hydraulic fluid 182 (e.g., a non-compressible fluid such as a mineral oil). First chamber 171 may include a pressurized air/gas with the hydraulic fluid 182 to provide a desired spring force. In embodiments, a portion of second chamber 172 has a compressible portion comprising a trapped compressible medium 180 which will be discussed in greater detail below.

In certain embodiments, the entire internal volume of outer cylinder 145 and inner cylinder 140 form the first and second chambers 171, 172. However, first and second chambers 171, 172 may have any configuration within outer and inner cylinders 145, 140 so long as they provide the desired functionality of containing hydraulic fluid 182 and, in the case of second chamber 172, also trapped compressible medium 180.

Typical oleo struts control resistance of the flow of hydraulic fluid 182 between inner and outer cylinders 140, 145, which is used to modulate damping of movement of inner cylinder 140 with respect to outer cylinder 145. As the hydraulic fluid 182 is non-compressible, the displacement and flow rate between inner and outer cylinders 140, 145 determines the compression resistance of the oleo strut.

As depicted in FIGS. 1-2, an orifice plate 120 provides a separation between the first chamber 171 and the second chamber 172. In some embodiments, first chamber 171 comprises an extension chamber and second chamber 172 comprises a compression chamber. The orifice plate 120 includes a plate having a plurality of holes to provide one or more corresponding paths for transfer of hydraulic fluid 182 between inner cylinder 140 and outer cylinder 145. In other words, the plurality of holes enable fluid coupling between first chamber 171 and second chamber 172 of outer cylinder 145 and inner cylinder 140, respectively. In certain embodiments, orifice plate 120 is aligned in a transverse direction, which is perpendicular to the longitudinal direction in which inner and outer cylinders 140, 145 move with respect to one another. When strut 100 compresses or extends, hydraulic fluid 182 is forced from one chamber to the other through the plurality of holes of orifice plate 120. The resistance to this flow creates a damping force that is affected by a flow area of the plurality of holes and by other characteristics of the flow.

In certain embodiments, as depicted in FIGS. 1-2, a support tube 130 is positioned concentrically within outer cylinder 145 and extends partially into inner cylinder 140 in the longitudinal direction for supporting orifice plate 120. Support tube 130 is for example a pipe, standpipe, or other member that is rigidly connected to the airframe at a first end (not shown). A second end 132 of support tube 130 is mechanically coupled to orifice plate 120 via a connecting portion 123 of orifice plate 120. For example, the second end 132 and the connecting portion 123 may both be threaded to enable a threaded coupling therebetween. A seal 121 seals the outer portion of orifice plate 120 with the inner diameter of inner cylinder 140 for preventing flow of hydraulic fluid 182 while allowing sliding of inner cylinder 140 with respect to orifice plate 120. In other words, orifice plate 120 is slidably inserted into inner cylinder 140. In an embodiment, seal 121 is a piston ring.

A metering pin 150 is mechanically coupled to a first end 141 of inner cylinder 140 via a bracket 144, extends longitudinally along a central axis within inner cylinder 140, and passes through a central port of orifice plate 120 and into support tube 130. The central port provides a hole through the center of orifice plate 120 that not only allows passage of metering pin 150 but is also sized to provide a primary fluid path 161 around metering pin 150 for hydraulic fluid 182 to flow between inner cylinder 140 and outer cylinder 145. A fluid flow 160 occurs in a direction from inner cylinder 140 to outer cylinder 145 during a compression phase of strut 100, as depicted in FIG. 1. Alternatively, a fluid flow 160 occurs in a direction from outer cylinder 145 to inner cylinder 140 during an extension phase of strut 100, as depicted in FIG. 2. A secondary fluid path 162 through orifice plate 120 may also be provided.

In some embodiments, strut 100 comprises a trapping plate 184 extending longitudinally from the orifice plate 120 into second chamber 172. Trapping plate 184 is configured to form a trapping zone 186. Trapping zone 186 provides an area within second chamber 172 in which trapped compressible medium 180 may be disposed. In other embodiments, different mechanisms may be used to provide trapping zone 186; for example, FIG. 6 described below shows an embodiment of a strut 300 having an orifice plate 320 for providing trapping zone 186 without the use of a trapping plate, such as trapping plate 184.

As depicted in FIGS. 1-2, trapping plate 184 does not preclude fluid flow 160 of hydraulic fluid 182 between the first chamber 171 and second chamber 172. Accordingly, the compression of strut 100 is still primarily regulated by the flow rate of the hydraulic fluid 182 from first chamber 171 into second chamber 172, as depicted in FIG. 1.

In certain embodiments, as depicted in FIGS. 1 and 2, trapped compressible medium 180 comprises a compressible material or gas. In some embodiments, trapped compressible medium 180 comprises a pressurized gas or air. In some embodiments, trapped compressible medium 180 comprises an elastomeric material, such that strut 100 need not have a trapping plate 184 as the elastomeric material may be affixed to the bottom of the orifice plate 120. In some embodiments, trapped compressible medium 180 comprises a combination of pressurized gas or air and an elastomeric material. For example, the elastomeric material may comprise internal compartments filled with a pressurized gas or air. In some embodiments, trapped compressible medium 180 comprises any sealed compressible solid, such as those known to one of ordinary skill in the art. For example, an elastomer or foam material may be encased in a sealed bladder to keep hydraulic fluid out thereby preserving gas pockets in the medium. Advantages of using a compressible material include that linear compression may be more readily attained compared to exponential compression of gas, a larger range of deflection for the same volume of compressible gas may be attained, and there is a smaller likelihood of losing gas from an encased compressible material. While trapped compressible medium 180 is depicted in FIGS. 1-3A in the upper portion of second chamber 172, in some embodiments in which trapped compressible medium 180 comprises an elastomeric material, the trapped compressible medium 180 may be affixed to the first end 141 of the second chamber 172.

Trapped compressible medium 180 (e.g., gas or compressible material) provides an intermediary buffer between compression of inner cylinder 140 and outer cylinder 145. For example, an initial compression force substantially in the longitudinal direction will cause compression of the trapped compressible medium 180, thereby reducing displacement of the hydraulic fluid 182 into the first chamber 171. In another example, when strut 100 is partially compressed (e.g., as in FIG. 1), and a spontaneous spike in compression force is exerted on the strut 100 (e.g., during aircraft taxiing), trapped compressible medium 180 may absorb most of the spontaneous compressive force as the trapped compressible medium 180 is compressible. Accordingly, compression of the trapped compressible medium 180 responds more rapidly than would the hydraulic fluid 182 flowing into the first chamber 171. Such an intermediary buffer allows strut 100 to respond to spontaneous spikes in compressive force more rapidly while also absorbing larger, sustained compressive forces that displace hydraulic fluid 182 between chambers.

Figure 3A:
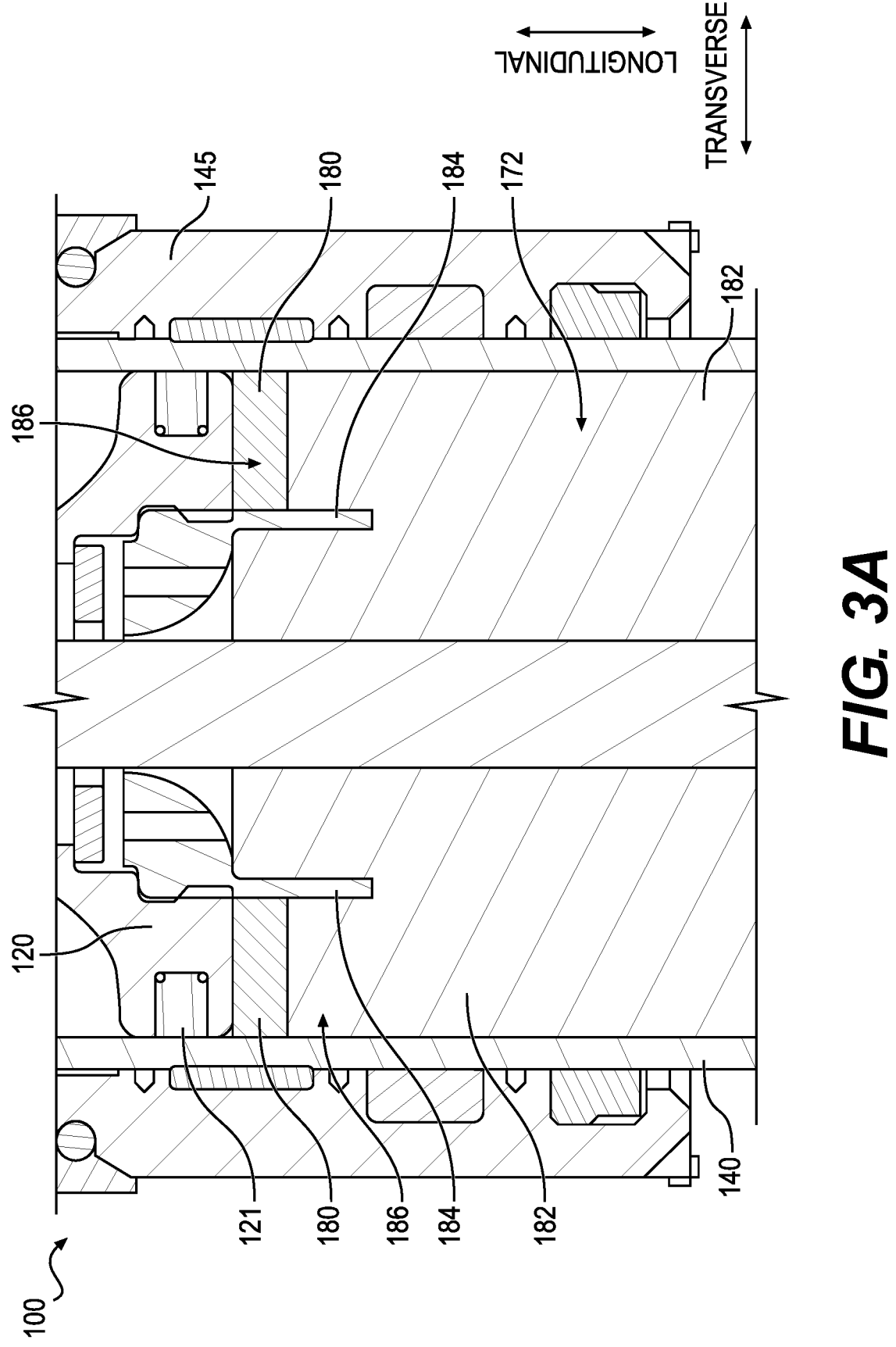
FIGS. 3A and 3B show a trapping zone of the spike damping system in some embodiments.
Figure 3B:
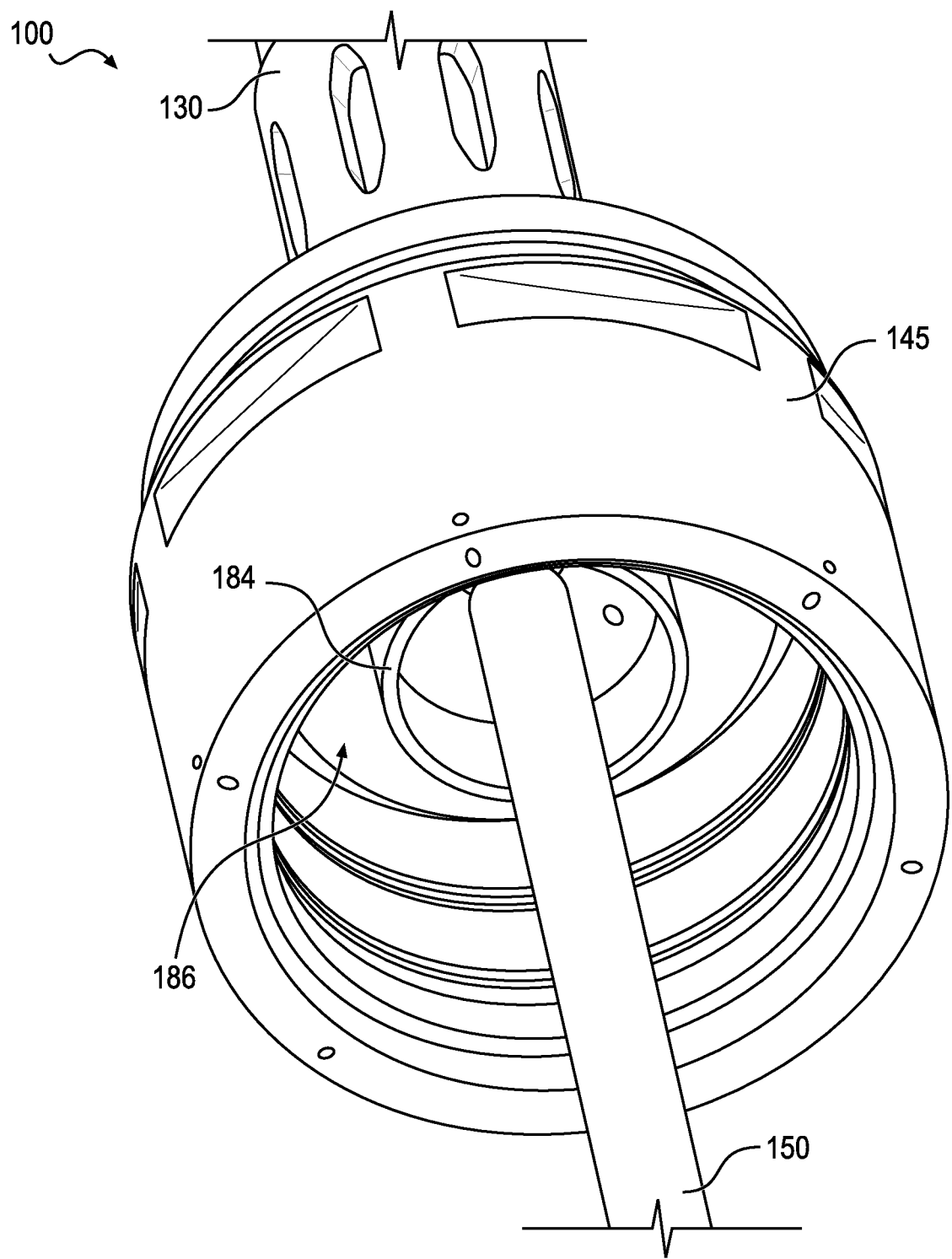

FIGS. 3A and 3B depict the trapping zone 186 of strut 100. It is noted that depiction of the trapping zone 186 in FIGS. 1-3B may not be to scale, and as such the size illustrated should not be construed as limiting. For example, the size of the trapping zone 186 and the trapped compressible medium 180 depicted in FIGS. 1-2 is much larger than that depicted in FIG. 3A. In some circumstances, too large of a trapping zone 186 and thus volume of trapped compressible medium 180 may significantly decrease the ability of strut 100 to dampen a large initial compressible force exerted on strut 100 (e.g., during landing of an aircraft). Therefore, careful consideration is taken when designing the size and volume of trapping zone 186.

FIG. 3A depicts a close up of the trapping zone 186 and trapped compressible medium 180 in some embodiments. Note that the trapping plate 184 may, in embodiments, be much smaller than the depictions of FIGS. 1-2. Accordingly, the total volume of trapped compressible medium 180 is much smaller in comparison to the total volume of the hydraulic fluid 182 that occupies the second chamber 172.

FIG. 3B illustrates a perspective view of the trapping zone 186 of strut 100, in some embodiments. Illustrated in FIG. 3B, portions of second chamber 172 have been hidden to reveal a three-dimensional view of the trapping zone 186. As can be seen, trapping plate 184 comprises a cylindrical shape disposed concentrically around metering pin 150 such that the trapping zone 186 is formed around an outer diameter of trapping plate 184. While trapping zone 186 is depicted as comprising a ring shape, it is contemplated that trapping zone 186 may comprise any shape that allows trapped compressible medium 180 to dampen spike compression forces. For example, strut 100 may comprise a second trapping plate disposed in a manner around the first trapping plate 184 that changes the shape and volume of trapping zone 186.

It is contemplated that the size and shape of trapping zone 186 may be configured to prevent the loss of the trapped compressible medium 180 in circumstances in which strut 100 is not substantially vertical. For example, in embodiments in which trapped compressible medium 180 comprises a pressurized gas or air, movement of the strut 100 out of a substantially vertical configuration may cause the movement of the pressurized gas or air due to the comparative density between gas and the hydraulic fluid. As an example, in some aircraft, strut 100 may move between a horizontal/stowed configuration, to a vertical/deployed configuration. In the horizontal/stowed configuration, the pressurized air or gas disposed in the trapping zone 186 may become displaced due to the movement of some hydraulic fluid therein. As such, the trapping zone 186 may be configured to not allow the escape of any pressurized air or gas when strut 100 is placed in the substantially horizontal/stowed configuration.

Figure 4:
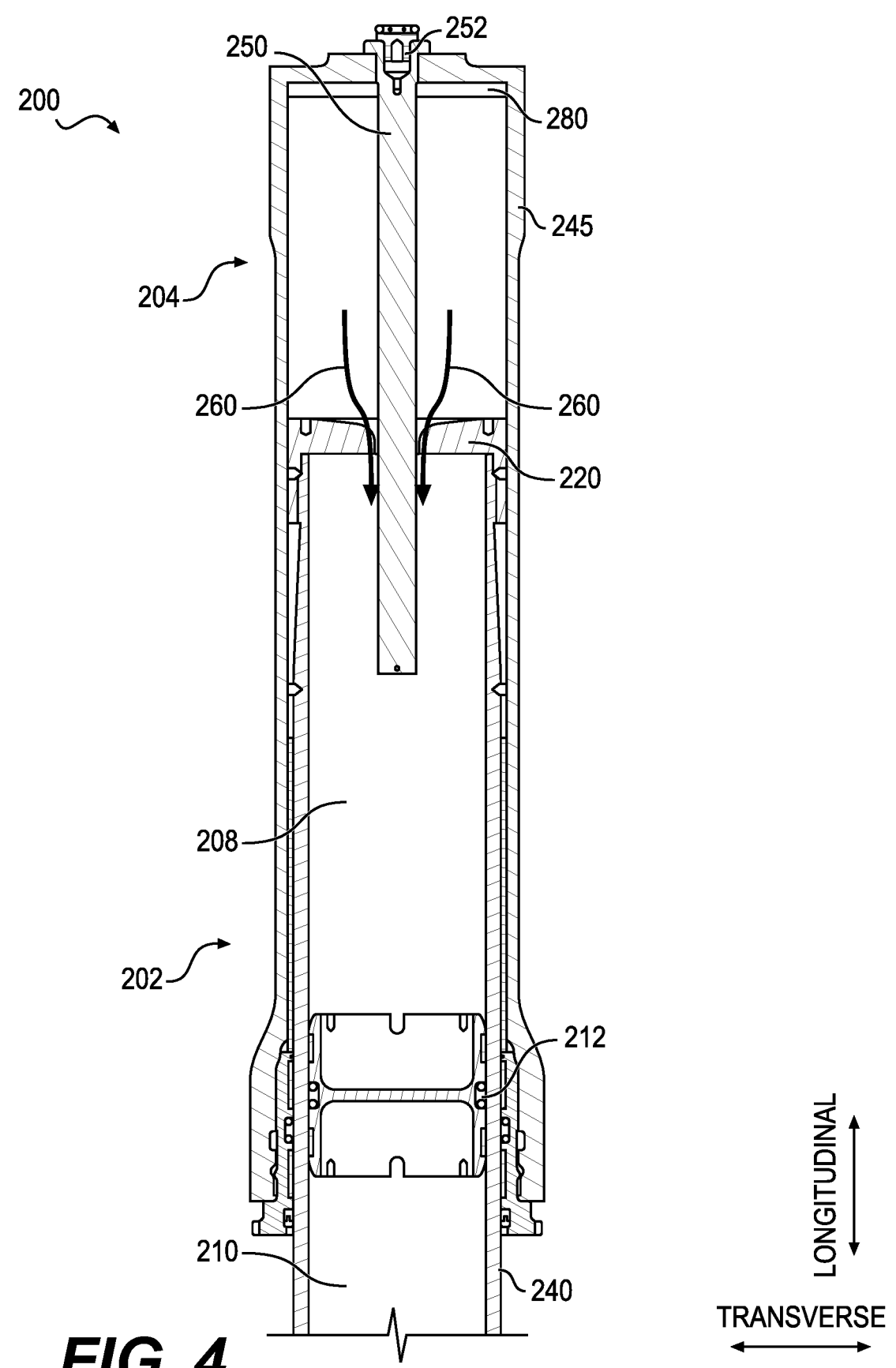
FIG. 4 is a cross-sectional view of a strut having a spike damping system of some embodiments during compression.
Figure 5:
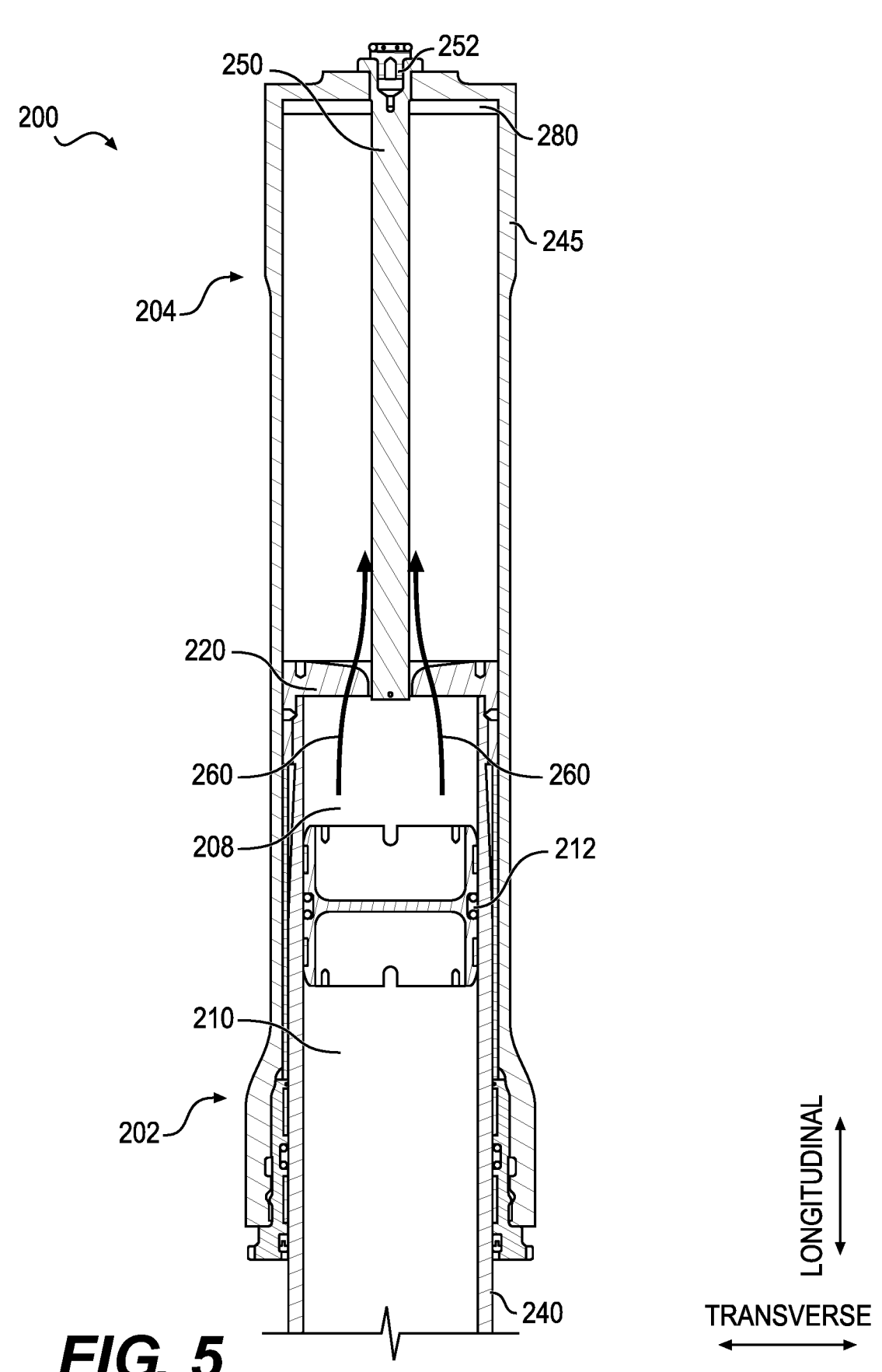
FIG. 5 is a cross-sectional view of the strut of FIG. 4 having a spike damping system of some embodiments during extension.

With reference to FIGS. 4-5, another embodiment of a strut 200 comprising a spike reduction system is depicted. FIG. 4 depicts strut 200 during compression while FIG. 5 depicts strut 200 during extension. Strut 200 comprises a second chamber 204 defined by an outer cylinder 245 and a first chamber 202 defined by an inner cylinder 240. In some embodiments, first chamber 202 comprises an extension chamber and second chamber 204 comprises a compression chamber. In embodiments, outer cylinder 245 and inner cylinder 240 compress and extend longitudinally in relation to one another upon exertion or release of compression forces on strut 200. First and second chambers 202, 204 comprise an orifice plate 220 disposed therebetween. Similar to strut 100, orifice plate 220 of strut 200 regulates the rate of flow of hydraulic fluid between the second chamber 204 and the first chamber 202. Additionally, orifice plate 220 is disposed around a metering pin 250, creating flow paths 260 for hydraulic fluid therebetween. For example, during compression (i.e., FIG. 4), hydraulic fluid may flow via flow paths 260 from the second chamber 204 into the first chamber 202. Alternatively, during extension (i.e., FIG. 5), hydraulic fluid may flow via flow paths 260 from first chamber 202 into the second chamber 204.

First chamber 202 of strut 200 comprises an isolation piston 212 which separates first chamber 202 into a first compartment 208 and a second compartment 210. The isolation piston 212 may be slidable along the longitudinal axis within first chamber 202. Accordingly, the size of first compartment 208 and second compartment 210 may adjust based on the state of compression or extension that strut 200 is currently exhibiting (e.g., size of first compartment 208 in FIG. 4 compared to FIG. 5). As will be discussed in greater detail below, this is due to the cumulative pressure exerted on isolation piston 212 from the first compartment 208 and second compartment 210.

Strut 200 further comprises a valve 252 disposed on the upper portion of outer cylinder 245. Valve 252 may be configured to allow a user to inject hydraulic fluid into portions of strut 200. For example, a user may inject hydraulic fluid through valve 252, therein filling some or all of first compartment 208 of the first chamber 202 and some of the second chamber 204. Valve 252 may be configured to release gas from first compartment 208 after hydraulic fluid is injected. Additionally, second compartment 210 of first chamber 202 may be filled with pressurized air or gas. For example, a user may initially fill all of first compartment 208 and a portion of second chamber 204 with hydraulic fluid injected through valve 252. Following filling with hydraulic fluid, a user may add pressurized air or gas to second compartment 210 of the first chamber 202. This pressurized air or gas biases isolation piston 212 towards first compartment 208, thereby forming resistance of strut 200 to compression forces.

Strut 200 further comprises the spike reduction system similar to the description above in relation to strut 100. For example, strut 200 comprises a compressible medium 280 disposed in the upper portions of second chamber 204. In some embodiments, compressible medium 280 may comprise a pressurized gas or air. In some embodiments, compressible medium 280 may comprise an elastomeric material. Similar to the description above with reference to strut 100, compressible medium 280 of strut 200 provides significant improvements to spike reduction of strut 200. For example, in a somewhat or mostly compressed state, strut 200 lacking the compressible medium 280 may be unable to react to spikes in compression forces (e.g., rough terrain that causes oscillations in the compression of strut 200 while taxiing). This may be due in part to the constraints of the flow rate of hydraulic fluid between the first and second chambers 202, 204. Accordingly, the compressible medium 280 may absorb (i.e., compress) when an additional spike in compression forces is exerted on strut 200, thereby acting as an intermediary buffer to compression forces similar to the trapped compressible medium 180.

The volume of compressible medium 280 may be adjusted based on multiple factors. In some embodiments, the volume of compressible medium 280 may be established by the size of valve 252. For example, the length of valve 252 that extends downwardly into metering pin 250 may set the overall volume of compressible medium 280 upon filling. As mentioned above, a user may fill first compartment 208 of first chamber 202 and a portion of second chamber 204 with hydraulic fluid by injecting it through valve 252. During this process, the level of hydraulic fluid will eventually reach the bottom portions of valve 252. At this point, no further hydraulic fluid may be injected, thereby trapping a portion of air in the upper portions of second chamber 204. Following pressurization of second compartment 210, the air trapped in the upper portion of second chamber 204 will subsequently form the compressible medium 280. In other embodiments, an elastomeric material may be disposed at the upper portion or lower portion of second chamber 204. Upon assembly of strut 200, the elastomeric material may similarly absorb spikes in compression forces similar to that described above. Therefore, compressible medium 280 may comprise either pressurized air or an elastomeric material and subsequently dampen spikes in compressive forces.

It is noted that in strut 200, no trapping plate (e.g., trapping plate 184) is required to contain the compressible medium 280. This is due to the density of the hydraulic fluid being greater than that of the compressible medium 280 combined with the lack of pathways moving vertically (i.e., away from gravitational pull) from second chamber 204. Accordingly, in embodiments in which compressible medium 280 is a pressurized gas, the gas will naturally rise to the top of second chamber 204 when strut 200 is in a vertical configuration (e.g., when landing gear is in the deployed/landing position). In other embodiments in which compressible medium 280 comprises an elastomeric material, the elastomeric material may be affixed to the upper wall of the second chamber 204. In other embodiments in which compressible medium 280 comprises an elastomeric material, the elastomeric material may be affixed to the top of orifice plate 220.

Figure 6:
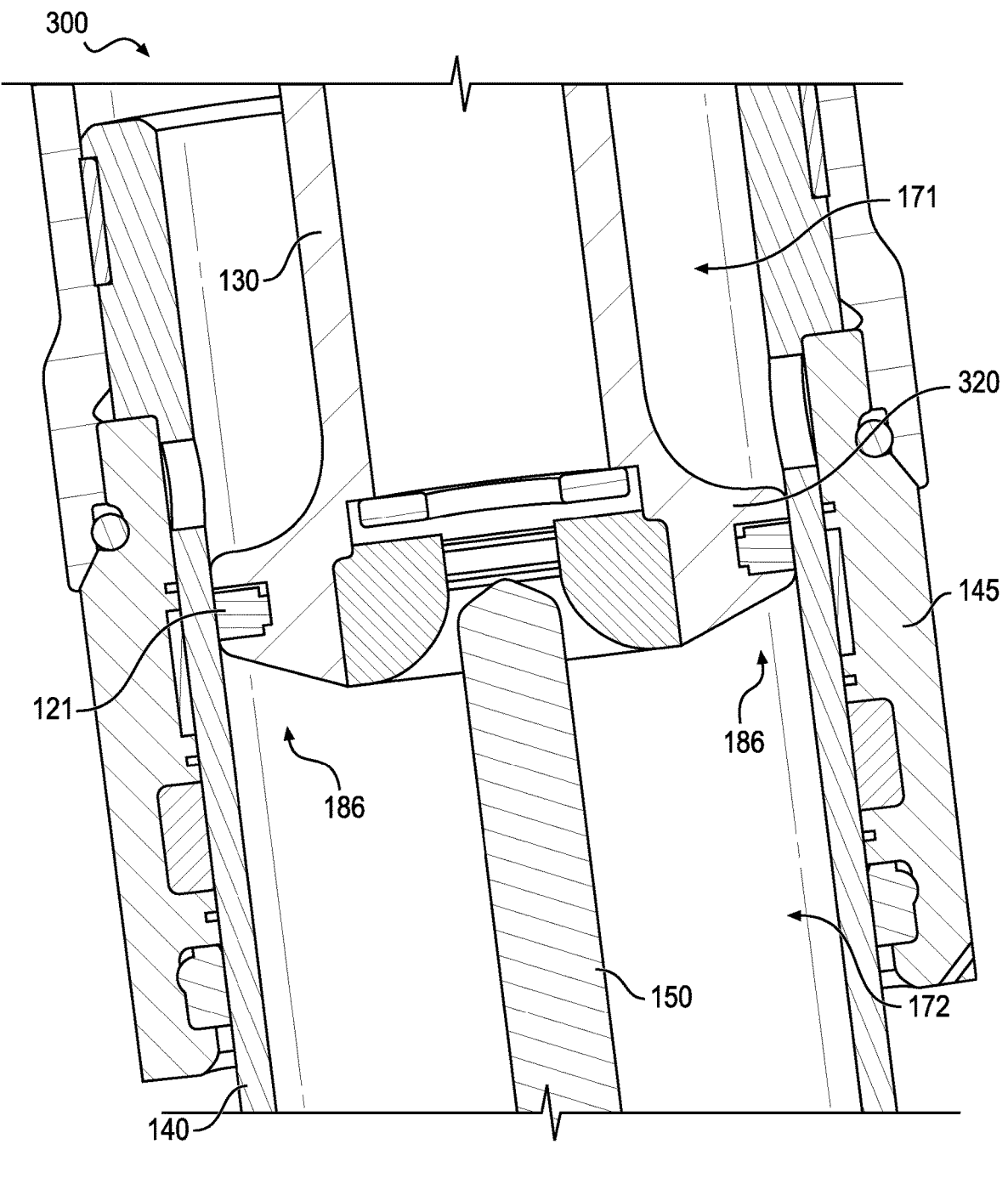
FIG. 6 is a cross-sectional view of another embodiment of a strut having a spike damping system.

FIG. 6 shows an exemplary strut 300 having an orifice plate 320 for providing trapping zone 186 without the use of a trapping plate, such as trapping plate 184 of FIGS. 1 and 2. Specifically, orifice plate 320 is modified compared with orifice plate 120 by having a bottom surface that is angled upwardly from the middle towards the outer diameter to trap compressible medium 180. In FIG. 6, trapped compressible medium 180 is not shown for clarity of illustration. The upwards shape of orifice plate 320 towards its outer diameter provides an alternate means of forming trapping zone 186 compared to strut 100. Without departing from the scope hereof, orifice plate 320 may be used in combination with a trapping plate, such as trapping plate 184 of FIGS. 1 and 2. When combined with trapping plate 184, the upwardly shaped portions of orifice plate 320 may provide an expanded zone for trapping compressible medium such that an overall size of trapping zone 186 is enlarged.

In some embodiments, the size of trapping zone 186 (e.g., by adjusting the length of trapping plate 184 and/or the shape of orifice plate 320) or of compressible medium 280 (e.g., by adjusting the length or size of valve 252) may be adjusted according to the expected compressive forces exerted on strut 100/200/300. For example, different compressive forces may be exerted on strut 100/200/300 depending on the size of the vehicle that strut 100/200/300 is disposed on. Similarly, strut 100/200/300 may experience more rapid oscillations in compressive forces depending on the vehicle strut 100/200/300 is placed. For example, an off-roading vehicle may experience greater fluctuations in spontaneous compressive forces than a typical highway vehicle. Accordingly, the size of trapping zone 186 or valve 252, and thus the volume of trapped compressible medium 180 or compressible medium 280, may be increased to accommodate the increased oscillations in compressive forces.

As mentioned above, in embodiments strut 100/200/300 may be disposed on a vehicle. Typically, strut 100/200/300 may be disposed on a portion of the vehicle that separates a certain compartment from the portion of the vehicle that is directly or indirectly contacting the ground. For example, strut 100/200/300 may be disposed on landing gear of an aircraft, the axle of a vehicle, the axle of a train or tram, etc. It is further envisioned that strut 100/200/300 may be placed on other areas of a vehicle that separate a user or passenger from oscillations in the vehicle. For example, strut 100/200/300 may be placed on the seat of a passenger, driver, pilot, etc. to keep the passenger relatively stable in relation to longitudinal movement of the vehicle. These examples should not be construed as limiting, as one skilled in the art can envision many uses for strut 100/200/300.

As can be seen, compressible mediums 180/280 of strut 100/200/300 provide significant advantages over typical oleo struts. As discussed above, the ability of strut 100/200/300 to react quickly to oscillations in compressive forces substantially decreases the transfer of such oscillations to the vehicle or passenger therein. Accordingly, the comfort of the passenger or user is significantly increased.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A compression-force spike reduction system for a strut, comprising:
  a piston having a volume with a first chamber fluidly coupled with a second chamber, wherein the first chamber and the second chamber both contain a compressible medium and a hydraulic fluid;
  an orifice plate disposed within the strut between the first chamber and the second chamber,
  wherein the orifice plate comprises at least one orifice configured for the hydraulic fluid to flow therethrough, such that during extension of the strut, hydraulic fluid flows from the first chamber to the second chamber, and during compression of the strut, hydraulic fluid flows from the second chamber to the first chamber; and
  a trapping plate mechanically coupled to the orifice plate, wherein the trapping plate extends longitudinally from the orifice plate into the second chamber thereby forming a trapping zone in the second chamber adjacent the orifice plate, such that the compressible medium is trapped in the trapping zone.

2. The compression-force spike reduction system of claim 1, wherein the first chamber comprises an extension chamber and the second chamber comprises a compression chamber.

3. The compression-force spike reduction system of claim 1, wherein the trapping plate is configured to maintain the compressible medium in the trapping zone during deployment of the strut.

4. The compression-force spike reduction system of claim 1, wherein the compressible medium comprises a pressurized gas.

5. The compression-force spike reduction system of claim 1, wherein the trapping plate comprises a cylindrical shape disposed concentrically around a metering pin such that the trapping zone is formed around an outer diameter of the trapping plate.

6. A compression-force spike reduction system for a strut, comprising:
  a piston having a volume with a first chamber fluidly coupled with a second chamber, wherein the first chamber and the second chamber both contain a compressible medium and a hydraulic fluid;
  an orifice plate disposed within the strut between the first chamber and the second chamber, wherein the orifice plate comprises at least one orifice configured for the hydraulic fluid to flow therethrough, such that during extension of the strut, hydraulic fluid flows from the first chamber to the second chamber, and during compression of the strut, hydraulic fluid flows from the second chamber to the first chamber; and
  a bottom surface of the orifice plate is angled upwardly from a middle portion towards an outer diameter such that an upwardly angled portion of the bottom surface forms a trapping zone in the second chamber adjacent the orifice plate, such that the compressible medium is trapped in the trapping zone.

7. The compression-force spike reduction system of claim 5, wherein a bottom surface of the orifice plate is angled upwardly from outside the trapping plate to an outer diameter of the orifice plate such that an upwardly angled portion of the bottom surface forms an expanded zone for containing an additional amount of the compressible medium.

8. The compression-force spike reduction system of claim 1, wherein the compressible medium comprises an elastomeric material affixed to a bottom side of the orifice plate.

9. The compression-force spike reduction system of claim 8, wherein the compressible medium comprises a combination of the elastomeric material and a pressurized gas contained within compartments of the elastomeric material.

10. The compression-force spike reduction system of claim 1, wherein the strut is disposed on a landing gear of an aircraft, and the compressible medium is configured to buffer spikes in compression force of the strut while the strut is partially compressed during taxiing of the aircraft.

11. The compression-force spike reduction system of claim 6, wherein the compressible medium comprises an elastomeric material.

12. The compression-force spike reduction system of claim 6, wherein the compressible medium comprises a pressurized gas.

13. The compression-force spike reduction system of claim 11, wherein the compressible medium comprises an elastomeric material having a pressurized gas contained within compartments of the elastomeric material.

* * * * *